Apr. 10, 1923.
F. S. LOW
1,451,399
PROCESS OF PRODUCING HALOGEN ACIDS
Filed Feb. 8, 1918
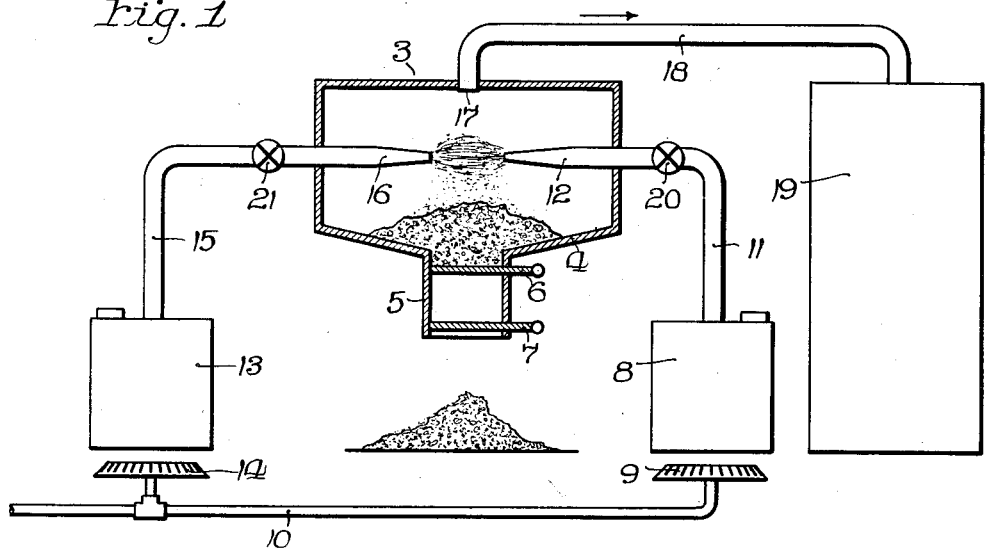
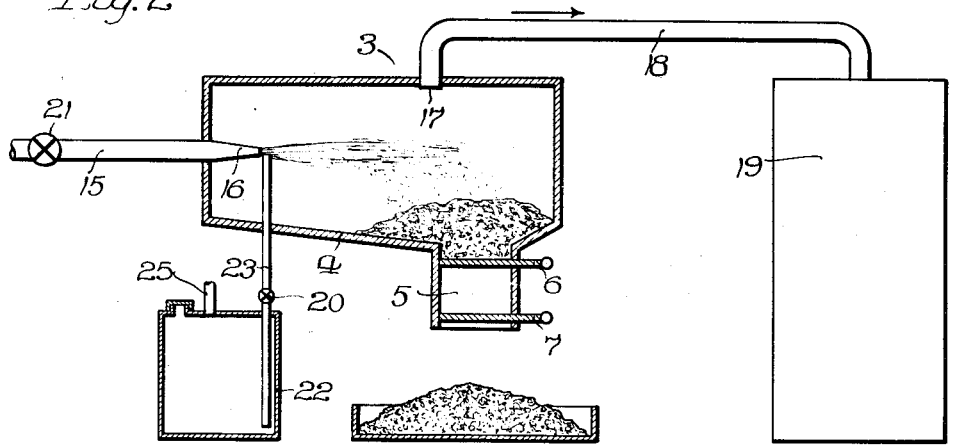
Inventor
Frank S. Low
By Brown, Hanson & Boettcher
Attorneys.

Patented Apr. 10, 1923.

1,451,399

UNITED STATES PATENT OFFICE.

FRANK S. LOW, OF NIAGARA FALLS, NEW YORK, ASSIGNOR TO WEAVER COMPANY, OF MADISON, WISCONSIN, A CORPORATION OF WISCONSIN.

PROCESS OF PRODUCING HALOGEN ACIDS.

Application filed February 8, 1918. Serial No. 216,062.

*To all whom it may concern:*

Be it known that I, FRANK S. LOW, a citizen of the United States, residing at Niagara Falls, in the county of Niagara and State of New York, have invented a certain new and useful Improvement in Process of Producing Halogen Acids, of which the following is a full, clear, concise, and exact description, reference being had to the accompanying drawings, forming a part of this specification.

My invention relates to the production of halogen acids. More specifically, my invention contemplates the conversion of chlorides by a distinctly novel process and apparatus of proven effectiveness and commercial adaptability.

As this description proceeds it will be clear to those skilled in the art that a measure of my invention may be realized in the production of acids of the other halogens and certain of the appended claims are so drawn as not to be limited to the use of chlorides for the formation of halogen acids. However, in view of the prior processes of producing hydrochloric acid, my invention presents a radical departure in hydrochloric acid production specifically, beyond features of my improved process and apparatus which may be common to the production of other halogen acids as well, and I have therefore drawn further claims limited precisely to the formation of that acid. It was with that acid in mind that I conducted the experiments which led to my invention and I consider it of first importance herein.

I contemplate the use of any adaptable chloride, particularly liquid chlorides. In this connection I prefer the use of silicon tetrachloride because of the requirements of my invention incident to its use specifically. In view of the importance of these refinements some of the appended claims are limited to the use of silicon tetrachloride, but others, as will be noted, are sufficiently broad to include any adaptable chloride, as titanium tetrachloride, for instance.

As an instance of my invention, and one which entails all the features thereof, which I shall describe in order to instruct those skilled in the art as to the use and result of my process and the structure, operation and result of my apparatus,—I shall refer to the conversion of silicon-tetrachloride into hydrochloric acid. This I effect by the use of steam, as will be described.

It is known that when silicon tetrachloride is mixed with water hydrochloric acid is formed. Silicic acid is also formed as a gelatinous mass which is difficult to deal with and which makes such a process of producing hydrochloric acid prohibitive commercially. In accordance with my process I carry on the reaction between $SiCl_4$ and $H_2O$ at a temperature above the de-hydrating point of silicic acid, specifically by the use of a jet of steam, with results as follows:

$$SiCl_4 + 2H_2O = 4HCl + SiO_2$$

In the accompanying drawing—

Figure 1 is a more or less diagrammatic representation of my improved apparatus; and Figure 2 is a similar representation of a modified and, for commercial purposes, a preferred form.

Referring first to Figure 1, it will be seen that I provide a reaction chamber 3 which has a sloping bottom 4 inclined toward an outlet chamber 5 defined by two slides 6 and 7 which are independently operable for a purpose to be pointed out presently.

A vessel 8, for liquid silicon tetrachloride, is adapted to be heated by means of a burner 9 supplied with a combustible gas by way of the pipe line 10. This vessel is provided with any suitable filling means and, in operation, has its only outlet leading by a pipe 11 to a nozzle 12 extending into the reaction chamber, as shown. The silicon tetrachloride is thus vaporized in the vessel 8, the vapor being fed from the nozzle 12 under the pressure thus produced.

A vessel 13, for water, is adapted to be heated by means of a burner 14, fed from the pipe line 10. This vessel is also provided with any suitable filling means and, in operation, has its only outlet leading by a pipe 15 to a nozzle 16 extending into the reaction chamber from the side opposite the point of entry of the nozzle 12 and toward and substantially in axial alignment with the nozzle 12. The water is thus vaporized in the vessel 13 and the steam thus formed is fed from the nozzle 16 under the pressure thus produced to impinge upon the silicon tetrachloride vapor from the nozzle 12. It will be seen that the steam may be obtained from any suitable source.

The mixing of the two compounds in this manner is most intimate, in view of their vaporous condition and the manner in which they are brought together and the desired chemical reaction ensues rapidly, effectively and immediately. The high temperature thus effectively provided for results in the reaction written above, the hydrochloric acid vapors passing upwardly and outwardly through the outlet 17 and, by way of the pipe 18, to the chamber 19 in which they are condensed in any well known manner, as by absorption in water, and the silica collecting as a loose incrustation of fine crystals. This collection of sand is removed from the reaction chamber by first opening the slide 6, then closing it, and then opening the slide 7, the trapped collection then dropping down. In this way the chamber 3 is always closed for continuous operation, the slide 7 being closed again in anticipation of the next opening of the slide 6.

It is obvious to those skilled in the art that suitable means can be arranged for breaking up the deposit without opening the chamber to the atmosphere.

For the reason already pointed out, the process and apparatus are eminently adapted to commercial uses. The resultants are easily handled, as will now be clear, and the initial compounds are introduced in the most easily handled conditions, which at the same time are the best conditions for intimate mixing and the necessary conditions for the proper and desired chemical reaction.

The pipes 11 and 15 are provided with valves 20 and 21, respectively, and by means of these valves the pressures in the two vaporizing vessels may be balanced against each other so as to control the contact of the two jets.

In Figure 2 I have illustrated the same form of apparatus as in Figure 1, the same reference characters being applied so far as applicable, except that the silicon tetrachloride vessel 22 is not heated but is provided with a liquid feed tube 23 extending upwardly from a point near the bottom and into the reaction chamber. An opening 25 is provided in the vessel 22 to admit dry air, dry chlorine or other suitable fluid non-reacting with respect to the silicon tetrachloride. The steam nozzle 16 and the outlet of the tube 23 are arranged in suitable relation to raise the silicon tetrachloride by ejector action, and to bring the steam and the silicon tetrachloride into intimate mixture. In this way the silicon tetrachloride is atomized by the jet of steam and the preliminary vaporization of the silicon tetrachloride done away with. Valves 21 and 20 may be provided in the tubes 15 and 23, respectively, for regulation of the quantities of flow in the tubes.

While the vessel 22 may be arranged to deliver the liquid to the atomizing nozzle by gravity or otherwise without the ejector action, I prefer to make use of the ejector action as described.

It is apparent that any excess of steam over that required for the reaction will absorb the hydrochloric acid and that by suitable control of the steam admitted, an aqueous solution of the desired degree of concentration may be secured.

I claim:

1. The process of producing a halogen acid by vaporizing a halide, which combines with $H_2O$ and directly treating such vapor with water vapor.

2. The process of producing a halogen acid by directly mixing a vapor of a halide, which combines with $H_2O$ and water vapor under pressure.

3. The process of producing hydrochloric acid by vaporizing a liquid chloride, which combines with $H_2O$ and treating it with water vapor.

4. The process of producing a halogen acid by impinging a jet of a halide vapor, which combines with $H_2O$ upon a jet of water vapor.

5. The process of producing hydrochloric acid by impinging a jet of a chloride vapor, which combines with $H_2O$ upon a jet of water vapor.

6. The process of producing hydrochloric acid by impinging a jet of silicon tetrachloride vapor upon a jet of water vapor.

7. The process of producing hydrochloric acid by impinging a jet of silicon tetrachloride vapor upon a jet of water vapor and adjusting the pressures of the two jets so that they are substantially balanced.

8. The process of producing hydrochloric acid and silica by impinging a jet of silicon tetrachloride vapor upon a jet of water vapor.

9. The process of producing hydrochloric acid and silica by impinging a jet of water vapor upon a jet of silicon tetrachloride vapor in a reaction chamber, collecting the hydrochloric acid vapor in a collecting chamber and removing the silica from said reaction chamber.

10. The process of vaporizing silicon tetrachloride, vaporizing water, impinging jets of the two vapors upon each other in a reaction chamber to form hydrochloric acid and silica, collecting the hydrochloric acid vapors in a condenser, and removing the silica from the reaction chamber.

11. The process of producing a halogen acid by independently heating a halide and feeding it vaporized from a nozzle, and impinging upon the jet thus formed an independently formed jet of steam.

In witness whereof I hereunto subscribe my name this 25th day of January, A. D. 1918.

FRANK S. LOW.